United States Patent Office 2,720,549
Patented Oct. 11, 1955

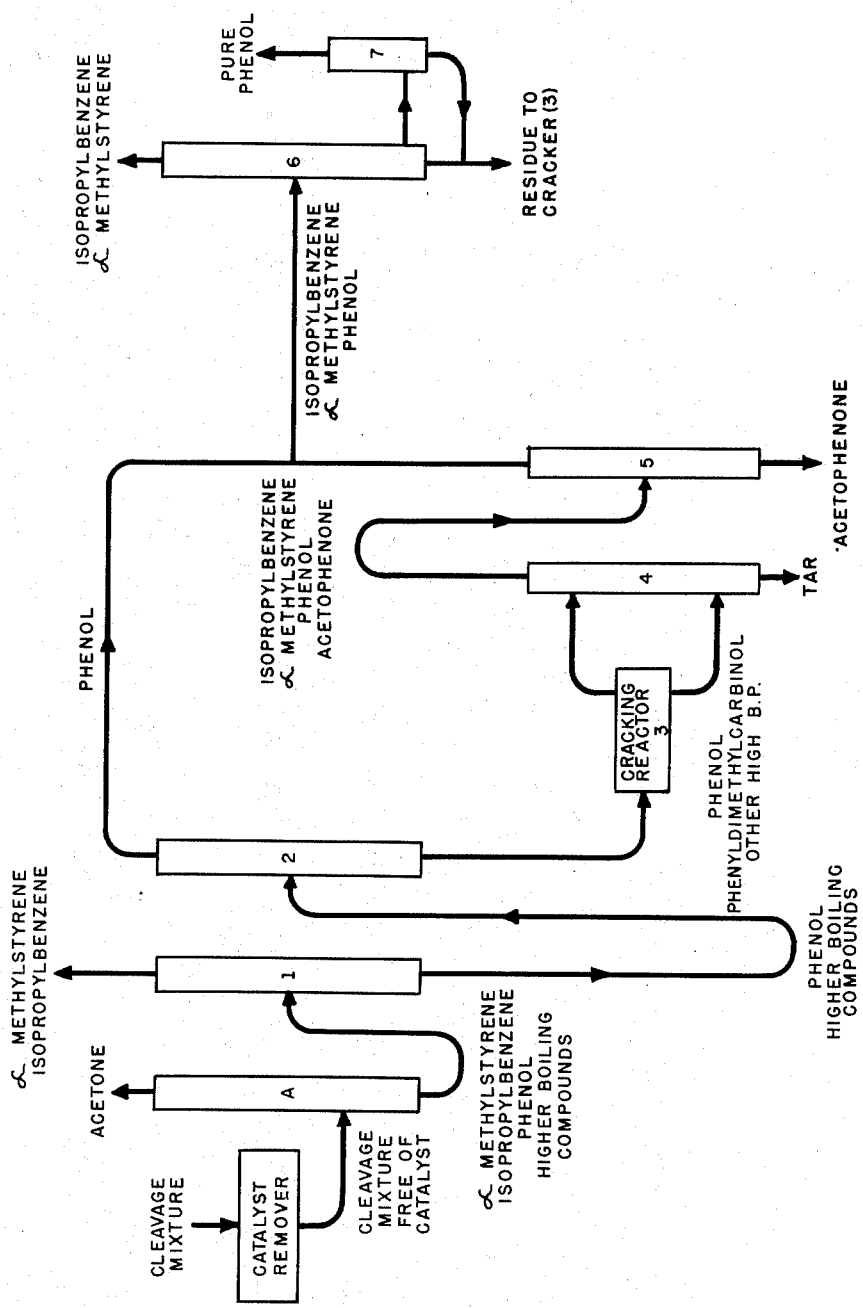

2,720,549

RECOVERY OF PHENOL

Godfrey Paul Armstrong, Kingswood, and Thomas Bewley and Maurice Dudley Cooke, Epsom, England, assignors, by mesne assignments, to Hercules Powder Company, a corporation of Delaware Application July 17, 1952, Serial No. 299,464

Claims priority, application Great Britain July 18, 1951

11 Claims. (Cl. 260—621)

The present invention refers to the recovery of phenol from the reaction product obtained by the cleavage of isopropylbenzene hydroperoxide by means of acidic decomposition catalysts, relating in particular to the recovery of phenol in a substantially pure state. The expression "hydroperoxide" in the following is meant to include the peroxide as well.

In this specification by "pure phenol" is meant a phenol which will fulfill the requirements laid down in British Standard Specification 523/38. By "substantially pure phenol" is meant a product of a high degree of purity, not necessarily sufficiently high to satisfy these requirements, but yet sufficiently pure to be marketable for most industrial purposes.

It has been found that when isopropylbenzene hydroperoxide is decomposed by means of catalysts such as acids, for instance, sulfuric acid, toluene sulfonic acid and acetic acid, acid-treated earths, hydrogen ion exchange materials, phosphorous pentachloride, or acidic salts such as aluminum chloride and ferric chloride, a decomposition reaction mixture results which contains phenol and acetone as the main products, together with a number of by-products including α-methylstyrene, acetophenone, phenyldimethyl carbinol, and cumyl phenol. If the hydroperoxide is decomposed in solution in isopropylbenzene, as when an oxidation reaction mixture containing unreacted isopropylbenzene is used, the decomposition mixture contains isopropylbenzene in addition to the above-mentioned compounds. The components of the decomposition mixture are preferably recovered therefrom by fractional distillation, when as first distillate the acetone distills off. When the fractional distillation is continued, preferably under reduced pressure, isopropylbenzene, if present in the decomposition reaction mixture together with water and then α-methylstyrene are distilled over, and the mixture of phenol, acetophenone and higher boiling compounds, such as phenyldimethyl carbinol and cumyl phenol, with some resinous matter formed by the polymerization of the α-methylstyrene remains in the still. When this mixture is distilled in order to recover therefrom the phenol as the desired main constituent, it has been found that, although the distillation is effected under very exacting fractionating conditions, the distilled phenol is not free from admixtures and certainly does not fulfill the requirements laid down by the B. S. specification 523/38 regarding solubility in water, but gives a turbid solution on dilution with water. Detailed investigations have shown that this turbidity is due to small amounts of unsaturated benzene derivatives, chiefly α-methylstyrene, distilling over with the phenol, and that as little as 260 parts per million of, for instance, α-methylstyrene are sufficient to furnish the objectionable turbidity.

As α-methylstyrene boils at a considerably lower temperature than phenol and as moreover the α-methylstyrene initially present in the decomposition reaction mixture has been distilled off completely, as shown by an analytical determination of the components of the mixture, the origin of the additional α-methylstyrene was at first obscure.

The present invention is based on the discovery that the α-methylstyrene distilling over after the initially present α-methylstyrene has been removed by distillation, is formed subsequently during the distillation by dehydration at elevated temperatures of the phenyldimethyl carbinol which is present in the decomposition reaction mixture. We have now found that this dehydration reaction is retarded by the presence of phenol. This retarding effect varies with the temperature and also with the proportion of phenol to the phenyldimethyl carbinol present. Thus at 150° C., which is a suitable temperature for the distillation of phenol, for instance with steam or under diminished pressure, if there is a high proportion of phenol to phenyldimethyl carbinol in the mixture to be distilled, the dehydration of the carbinol to α-methylstyrene at first takes place very slowly indeed. In the course of the distillation the proportion of phenol to the phenyldimethyl carbinol diminishes, the temperature in the distillation equipment rises correspondingly, and accordingly the decomposition of the carbinol is accelerated so that especially towards the end of the distillation considerable quantities of α-methylstyrene are distilled off with the phenol.

According to the present invention, the process for the recovery of substantially pure phenol comprises fractionally distilling a phenol-containing mixture, derived from the catalytic cleavage of isopropylbenzene hydroperoxide under such conditions that the major part of the phenol is distilled off but there remains in the still sufficient phenol to prevent any appreciable dehydration of phenyldimethyl carbinol.

The phenol-containing mixture is preferably freed of the cleavage catalyst before it is subjected to fractional distillation.

At the beginning of the fractional distillation of the cleavage mixture, after removal of the lower boiling constituents, the phenol in the still is in a very large excess over the phenyldimethyl carbinol so that practically no dehydration of the phenyldimethyl carbinol occurs and the phenol distilling over is substantially pure.

It has been found that when, for instance, the distillation is carried out at atmospheric pressure and with a cleavage mixture with an initial content, after removal of the lower boiling constituents, of phenol and phenyldimethyl carbinol in a proportion of approximately 20:1, it is possible to recover about 70% of the phenol present in the mixture substantially pure, the proportion of phenol to phenyldimethyl carbinol in the still upon completion of the distillation being about 5:1. On the other hand, when the distillation of the cleavage mixture is effected under reduced pressure, such as 10 mm. of mercury, up to about 95% of the phenol initially present may be distilled from the mixture in a substantially pure state. At the end of the latter distillation the proportion of phenol to phenyldimethyl carbinol in the still was approximately 0.7:1. Thus, the distillation of the phenol is interrupted when the ratio of phenol to phenyldimethyl carbinol in the still varies from 5:1 in atmospheric pressure distillation down to 0.7:1 in distillation under a pressure of 10 mm. of mercury. In any case the resulting phenol if free from phenyldimethyl carbinol may be freed from the remaining impurities by a further fractionation to give a phenol which fulfills the requirements of the British Standard specification.

As in the course of the distillation the mixture being distilled becomes poorer in phenol, and the temperature in the distillation vessel rises accordingly, dehydration of the phenyldimethyl carbinol increases correspondingly. Thus, whilst the first fractions of the phenol coming over are completely or substantially completely free from admixed α-methylstyrene, the phenol obtained at a later stage of the distillation will contain noticeable amounts of α-methylstyrene. According to the invention, therefore, the phenol distillation is interrupted when the contamination of the phenol by α-methylstyrene becomes objectionable. It may then be continued at a reduced pressure and consequently at a lower temperature so that further dehydration of the phenyldimethyl carbinol is minimized. The whole residue from the distillation may then be subjected to cracking in order to recover phenol from the resulting products.

The still residue, which contains the remaining part of the phenyldimethyl carbinol originally present in a decomposition mixture, which has not undergone dehydration during the distillation, in addition to other high boiling decomposition products of the isopropylbenzene hydroperoxide, and which contains some phenol may be subjected to a suitable treatment to dehydrate the phenyldimethyl carbinol to yield α-methylstyrene. For example, the distillation residue may be heated to a temperature in excess of 180° C. and preferably within the range from 250°–300° C. Such heat treatment effects dehydration of phenyldimethyl carbinol. Since, however, p-cumyl phenol is also present in the still residue and since this compound may be decomposed with the formation of phenol and α-methylstyrene when heated at temperatures which are higher than those which will effect the dehydration of phenyldimethyl carbinol, it is preferred to heat the still residue at a temperature between 250° and 400° C., preferably between 300° and 400° C., by which treatment not only the phenyldimethyl carbinol is dehydrated but also the p-cumyl phenol is decomposed, and additional amounts of α-methylstyrene and phenol are obtained. The heat treatment may be carried out by introducing the still residue into and preferably below the surface of liquid still residues which were left behind by previous operations and which are kept at temperatures between 300° and 400° C. When working in a continuous manner, an amount of these still residues corresponding to the quantity of high boiling substances remaining undistilled may be withdrawn from the still, either intermittently or continuously to maintain a substantially constant volume of the still residues in the cracking device. The dehydration of the phenyldimethyl carbinol and the decomposition of the p-cumyl phenol may be improved if a small amount of acid, for instance, 0.1% sulfuric acid, is present in the heating zone. The acid may be added to the heating zone where it is renewed when operating continuously by continuous or intermittent addition, or it may be added with the feed.

Upon completion of the pyrolysis treatment of the still residue, the resulting mixture will contain phenol, α-methylstyrene and acetophenone. The phenol contained in this mixture may then be separated readily from the α-methylstyrene by fractional distillation and may be recovered in a pure state and substantially free from hydrocarbons. Near the end of the distillation of the phenol fraction, the acetophenone present will form an azeotropic mixture with the phenol, but such a mixture may be separated by extraction, for instance with aqueous sodium hydroxide solution. From the aqueous phenol solution the phenol may be liberated in the well-known manner, for instance by acidification. The fractional distillation of the products from heat treatment of the still residue may be carried out at ordinary pressure, but is preferably effected under diminished pressure.

As an alternative distillation procedure, the mixture resulting from the heat treatment may be subjected to distillation in the presence of water to separate the hydrocarbons from the phenol. For example, the mixture may be subjected to steam distillation which can be adjusted in such a way that only the hydrocarbons such as α-methylstyrene with only a small amount of phenol are distilled over. The residual material containing most of the phenol then may be fractionally distilled to seperate the phenol and acetophenone.

The process of the invention may be carried out batchwise or in a continuous manner. The accompanying diagrammatic drawing illustrates the way in which the process of the invention may be executed in a continuous manner. The cleavage mixture from which the catalyst and acetone have previously been removed, the acetone removal being accomplished in column (A), is introduced into a fractionating column 1 in which α-methylstyrene and any isopropylbenzene initially present in the cleavage mixture are distilled off whilst phenol together with higher boiling substances are taken out as residue and introduced into fractionating column 2. The temperature and/or the pressure in column 2 are adjusted in such a manner that phenol is distilled over whilst in the still base with the phenyldimethyl carbinol and other high boiling products so much phenol is kept as will prevent appreciable decomposition of the phenyldimethyl carbinol during the distillation.

This residue is taken to a cracking zone 3. The gaseous and liquid products from the cracking zone are led into a column 4 from the base of which high-boiling tar is extracted, while the gaseous products containing isopropylbenzene, α-methylstyrene, phenol and acetophenone are passed on to a further column 5 where acetophenone is removed as a bottom product in conjunction with some of the phenol, which can be recovered by extraction from the acetophenone with aqueous sodium hydroxide. The distillate comprising the bulk of the phenol with isopropylbenzene and α-methylstyrene is fed to a further column 6 where isopropylbenzene and α-methylstyrene are removed overhead.

If the phenol distilled over from column 2 contains more α-methylstyrene than can be tolerated in the final product, the distillate is taken into column 6. From the latter column phenol vapor containing traces of α-methylstyrene-phenol condensation products as well as polymerized α-methylstyrene is taken to a small column 7 from which pure phenol is taken as an overhead fraction while the liquid residue is returned to column 6. The phenol from column 7 is sufficiently pure to fulfill the requirements of the B. S. specification. The residue from column 6, on the other hand, is returned to the cracking device 3.

In an alternative arrangement the cracking zone 3 is dispensed with, and the column 4 is operated with a kettle temperature of about 320° C. If the phenol distilling over from column 2 is sufficiently pure, the column 5 may be operated to remove α-methylstyrene while the liquid residue containing phenol, acetophenone and small amounts of polymer is passed to a further column from which pure phenol is removed as an overhead fraction.

Another alternative is to recycle distillate from column 5 to column 1. In this method all the phenol product (apart from that associated with acetophenone) is removed overhead in column 2. The distillate from column 2 may then be separated into its components in columns 6 and 7, as previously described.

In an arrangement wherein the separation of α-methylstyrene and isopropylbenzene from the phenol is effected, the columns 1 and 2 in the drawing may be replaced by a still for batch distillation fitted with a fractionating column. Through this, first methylstyrene and isopropylbenzene with some phenol and water are distilled off followed by substantially pure phenol. The residue from the batch distillation still is subsequently pumped through the cracking device 3.

The following examples serve to illustrate the manner in which the process of the invention may be carried out in a batchwise manner. The indicated parts are parts by weight.

*Example 1*

Four thousand parts by weight of decomposer product (obtained by acid cleavage of an isopropylbenzene hydroperoxide product) containing 1,240 parts of phenol and 63 parts of phenyldimethyl carbinol were fractionated batchwise at atmospheric pressure through a 5 ft. by 2 inch packed column. The acetone fraction was removed as the first fraction followed by hydrocarbons and water together with 21 parts of phenol. Then 890 parts of substantially pure phenol were taken off. (This represents 71.8% of the phenol in the original charge.) The ratio of phenol to phenyldimethyl carbinol at the last stage of this distillation in the still base was about 5:1, when noticeable dehydration of phenyl dimethyl carbinol with the formation of $\alpha$-methylstyrene occurred. The residue from the distillation was then taken to a cracking zone where it was subjected to a temperature of about 350° C. From the resulting product phenol, isopropylbenzene and $\alpha$-methylstyrene were recovered by fractional distillation.

*Example 2*

Three thousand seven hundred ninety-one parts by weight of decomposer product containing 1,207 parts of phenol and 60 parts phenyldimethyl carbinol were subjected to batch fractional distillation through a 5 ft. by 2 inch packed column, the acetone being removed as a first fraction at atmospheric pressure, after which the water, cumene and $\alpha$-methylstyrene with a small amount of phenol were removed at 50 mm. pressure. One thousand fifty-five parts of substantially pure phenol representing 87.5% of the phenol in the initial charge, were then removed at 50 mms. After the removal of this amount of phenol the temperature in the base of the still had reached 150° C., and the phenol to phenyldimethyl carbinol ratio in the still base was of the order of 1:1. On continuing the distillation decomposition of the phenyldimethyl carbinol took place as shown by the appearance of water and $\alpha$-methylstyrene in the phenol distillate. The residue was subsequently subjected to a pyrolyzing heat treatment as described in Example 1.

*Example 3*

Four thousand parts by weight of decomposer product containing 1,240 parts and 63 parts by weight of phenol and phenyldimethyl carbinol respectively were subjected to batch fractionation through a 5 ft. by 2 inch packed column. The acetone was removed at atmospheric pressure followed by the hydrocarbon fraction containing 20 parts of phenol at 30 mms. At this point the pressure was reduced to 10 mms. and the distillation continued at this pressure. One thousand one hundred seventy-five parts of substantially pure phenol was recovered (representing 95% of the phenol in the initial charge). During this distillation the temperature in the base of the still never exceeded 120° C., and the ratio of phenol to phenyldimethyl carbinol in the still base was 0.7:1 at the conclusion of this distillation.

*Example 4*

A mixture of the following approximate composition was obtained from the isopropylbenzene hydroperoxide decomposition reaction: 1266 parts acetone, 200 parts water, 200 parts isopropylbenzene, 196 parts $\alpha$-methylstyrene, 2122 parts phenol, 94 parts acetophenone, 88 parts phenyldimethyl carbinol, 129 parts higher phenols and 100 parts miscellaneous high molecular weight compounds.

The mixture was first treated in a continuous still, at atmospheric pressure, for removal of acetone, which was obtained in crude form and was subsequently purified. The acetone-free material from the base was sent to another continuous still, termed here the "crude phenol" still (which may be operated under reduced pressure or at atmospheric pressure, depending on the temperature of available steam). This column was operated under reduced pressure of 60 mm. Hg absolute pressure at the condenser. The purpose of this still, which is adjusted in such a way that substantially no phenyldimethyl carbinol distills over, is to remove as distillate the bulk of the phenol (70–90% of the phenol in the feed) containing lower boiling materials, such as water and hydrocarbon. A reflux ratio of 3 was used, and the column contained 35 plates. The distillate consisted of approximately: 206 parts water, 200 parts isopropylbenzene, 200 parts $\alpha$-methylstyrene and 1696 parts phenol. With an absolute pressure of 60 mm. Hg at the condenser, the temperatures at the top and bottom of the column, allowing for pressure drop, were about 100° and 155° C. respectively, with the material balance given.

This distillate from the "crude phenol" still, was sent to a third continuous still, the "pure phenol" still, which was operated under reduced pressure. Owing to the practically complete absence of phenyldimethyl carbinol and acetophenone in the feed, it was possible to remove phenol substantially free from hydrocarbon and higher boiling impurities from the base of the column and the low boiling materials, together with a small amount of phenol, from the top.

The "pure phenol" still was operated adequately with a stripping ratio of about 0.5. The number of plates to be used depends on the phenol and distillate purities desired. With a suitable number of stripping plates, phenol containing less than 0.05 weight per cent hydrocarbon was obtained. Reduced pressure may again be desirable, depending upon the pressure of the available steam.

The residues from the "crude phenol" still consisted of approximately: 10 parts $\alpha$-methylstyrene, 415 parts phenol, 46 parts phenyldimethyl carbinol, 94 parts acetophenone, 150 parts higher phenols and 112 parts other high molecular weight compounds, and was pumped to a cracker which was maintained at a temperature in the region of 300° C., which sufficed both to decompose residual phenyldimethyl carbinol very rapidly and also to "crack" the cumyl phenol back to $\alpha$-methylstyrene and phenol. The cracker distillate consisted of: 6 parts water, 104 parts $\alpha$-methylstyrene, 493 parts phenol and 94 parts acetophenone. Acetophenone was removed by distillation as a maximum boiling azeotrope with phenol, and the distillate, consisting of approximately: 6 parts water, 104 parts $\alpha$-methylstyrene and 443 parts phenol was sent to the "pure phenol" still, where it joined the distillate from the "crude phenol" still.

What we claim and desire to protect by Letters Patent is:

1. A process for the recovery of pure phenol from a mixture containing phenol and obtained through acidic catalytic decomposition of isopropylbenzene hydroperoxide which comprises fractionally distilling said mixture to remove the major part of the phenol, the distillation of the phenol being interrupted when the ratio of phenol to phenyldimethyl carbinol in the still is a value varying from 5:1 in atmoshperic pressure distillation down to 0.7:1 in distillation under a pressure of 10 mm. of mercury, thereby leaving sufficient phenol in the distillation residue to prevent appreciable dehydration of the phenyldimethyl carbinol also present therein.

2. The process of claim 1 wherein the pressure during the distillation is so adjusted that the ratio of phenol to phenyldimethyl carbinol in the mixture being distilled does not become less than that required to prevent appreciable dehydration of said carbinol.

3. The process of claim 2 wherein the distillation is carried out at atmospheric pressure and the ratio of phenol to phenyldimethyl carbinol does not become less than 5:1.

4. The process of claim 2 wherein the distillation is carried out under 10 mm. Hg pressure and the ratio of phenol to phenyldimethyl carbinol does not become less than 0.7:1.

5. A process for the recovery of pure phenol from a mixture containing phenol and obtained through acidic catalytic decomposition of isopropylbenzene hydroperoxide which comprises removing the acidic catalyst from said mixture, fractionally distilling the catalyst-free mixture to remove the major part of the phenol, the distillation of the phenol being interrupted when the ratio of phenol to phenyldimethyl carbinol in the still is a value varying from 5:1 in atmospheric pressure distillation down to 0.7:1 in distillation under a pressure of 10 mm. of mercury, thereby leaving sufficient phenol in the distillation residue to prevent appreciable dehydration of the phenyldimethyl carbinol also present therein.

6. A process for the recovery of pure phenol from a mixture containing phenol and obtained through acidic catalytic decomposition of isopropylbenzene hydroperoxide which comprises removing the acidic catalyst from said mixture, fractionally distilling the catalyst-free mixture to remove the major part of the phenol, the distillation of the phenol being interrupted when the ratio of phenol to phenyldimethyl carbinol in the still is a value varying from 5:1 in atmospheric pressure distillation down to 0.7:1 in distillation under a pressure of 10 mm. of mercury, thereby leaving sufficient phenol in the distillation residue to prevent appreciable dehydration of the phenyldimethyl carbinol also present therein, and subjecting the distillation residue to heat treatment at a temperature between 180° and 400° C.

7. A process for the recovery of pure phenol from a mixture containing phenol and obtained through acidic catalytic decomposition of isopropylbenzene hydroperoxide which comprises removing the acidic catalyst from said mixture, fractionally distilling the catalyst-free mixture to remove the major part of the phenol, the distillation of the phenol being interrupted when the ratio of phenol to phenyldimethyl carbinol in the still is a value varying from 5:1 in atmospheric pressure distillation down to 0.7:1 in distillation under a pressure of 10 mm. of mercury, thereby leaving sufficient phenol in the distillation residue to prevent appreciable dehydration of the phenyldimethyl carbinol also present therein, and subjecting the distillation residue to heat treatment at a temperature between 250° and 400° C.

8. A process for the recovery of pure phenol from a mixture containing phenol and obtained through acidic catalytic decomposition of isopropylbenzene hydroperoxide which comprises removing the acidic catalyst from said mixture, fractionally distilling the catalyst-free mixture to remove the major part of the phenol, the distillation of the phenol being interrupted when the ratio of phenol to phenyldimethyl carbinol in the still is a value varying from 5:1 in atmospheric pressure distillation down to 0.7:1 in distillation under a pressure of 10 mm. of mercury, thereby leaving sufficient phenol in the distillation residue to prevent appreciable dehydration of the phenyldimethyl carbinol also present therein, and subjecting the distillation residue to heat treatment at a temperature between 300° and 400° C.

9. A process for the recovery of pure phenol from a mixture containing phenol and obtained through acidic catalytic decomposition of isopropylbenzene hydroperoxide which comprises removing the acidic catalyst from said mixture, fractionally distilling the catalyst-free mixture to remove the major part of the phenol, the distillation of the phenol being interrupted when the ratio of phenol to phenyldimethyl carbinol in the still is a value varying from 5:1 in atmospheric pressure distillation down to 0.7:1 in distillation under a pressure of 10 mm. of mercury, thereby leaving sufficient phenol in the distillation residue to prevent appreciable dehydration of the phenyldimethyl carbinol also present therein, subjecting the distillation residue to heat treatment at a temperature between 180° and 400° C., and subsequently fractionally distilling the heat-treated mixture to separate pure phenol.

10. A process for the recovery of pure phenol from a mixture containing phenol and obtained through acidic catalytic decomposition of isopropylbenzene hydroperoxide which comprises removing the acidic catalyst from said mixture, fractionally distilling the catalyst-free mixture to remove the major part of the phenol, the distillation of the phenol being interrupted when the ratio of phenol to phenyldimethyl carbinol in the still is a value varying from 5:1 in atmospheric pressure distillation down to 0.7:1 in distillation under a pressure of 10 mm. of mercury thereby leaving sufficient phenol in the distillation residue to prevent appreciable dehydration of the phenyldimethyl carbinol also present therein, heat treating the distillation residue by introducing said distillation residue into liquid still residues from previous operations at a temperature between 300° and 400° C., and subsequently fractionally distilling the heat-treated mixture to separate pure phenol.

11. A process for the recovery of pure phenol from a mixture containing phenol and obtained through acidic catalytic decomposition of isopropylbenzene hydroperoxide which comprises first fractionally distilling said mixture to remove the major part of the phenol as distillate, the distillation of the phenol being interrupted when the ratio of phenol to phenyldimethyl carbinol in the still is a value varying from 5:1 in atmospheric pressure distillation down to 0.7:1 in distillation under a pressure of 10 mm. of mercury, thereby leaving sufficient phenol in the distillation residue to prevent appreciable dehydration of the phenyldimethyl carbinol also present therein, and fractionally distiling the phenol distillate from the first distillation to recover pure phenol.

References Cited in the file of this patent

UNITED STATES PATENTS

| 2,345,625 | Palmer et al. | Apr. 4, 1944 |
| 2,628,983 | Aller et al. | Feb. 17, 1953 |

FOREIGN PATENTS

| 670,444 | Great Britain | Apr. 16, 1952 |